(12) United States Patent
Ott et al.

(10) Patent No.: US 12,446,133 B2
(45) Date of Patent: Oct. 14, 2025

(54) CIRCUIT PROTECTION DEVICE AND SYSTEM WITH POWER SUPPLY CONVERSION AND CONTROL FOR DC LOADS

(71) Applicant: EATON INTELLIGENT POWER LIMITED, Dublin (IE)

(72) Inventors: Toni Ott, Neckargemünd (DE); Joseph Manahan, Manlius (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 506 days.

(21) Appl. No.: 17/797,346

(22) PCT Filed: Jan. 27, 2021

(86) PCT No.: PCT/EP2021/025030
§ 371 (c)(1),
(2) Date: Aug. 3, 2022

(87) PCT Pub. No.: WO2021/151623
PCT Pub. Date: Aug. 5, 2021

(65) Prior Publication Data
US 2023/0054080 A1    Feb. 23, 2023

(30) Foreign Application Priority Data
Jan. 31, 2020    (DE) .......................... 102020102399.5

(51) Int. Cl.
*H05B 45/56* (2020.01)
*H02H 5/04* (2006.01)
*H05B 45/3725* (2020.01)

(52) U.S. Cl.
CPC ............... *H05B 45/56* (2020.01); *H02H 5/04* (2013.01); *H05B 45/3725* (2020.01)

(58) Field of Classification Search
CPC .. H01H 1/5844; H01H 1/5855; H01H 1/5866; H01H 2001/5872;
(Continued)

(56) References Cited

U.S. PATENT DOCUMENTS 9,827,863 B2 *  11/2017  Bartz ................... B60L 53/122
10,276,321 B2    4/2019  Kennedy et al.
(Continued)

FOREIGN PATENT DOCUMENTS

CN    204947704 U    1/2016
CN    205657878 U    10/2016
(Continued)

OTHER PUBLICATIONS

Steven M. Kaplan, "C," in Wiley Electrical and Electronics Engineering Dictionary, IEEE, 2004, pp. 88-162 Retrieved from the Internet: <https://ieeexplore.ieee.org/xpl/ebooks/bookPdfWithBanner.jsp?fileName=5273129.pdf&bkn=5273107&pdfType=chapter(Year: 2004).*

(Continued)

*Primary Examiner* — Danny Nguyen
*Assistant Examiner* — Nicolas Bellido
(74) *Attorney, Agent, or Firm* — Merchant & Gould P.C.

(57) ABSTRACT

Hazardous location compliant solid state circuit protection device (100) includes at least one solid state switching element (142*a-d*) and a load controller (170). The solid state switching element operates in an arc-free manner to limit or preclude electrical current flow from the line-side terminal (132) to the load-side terminal (136). The load controller includes power converter circuitry (172) operative to convert an alternating current (AC) power supply input to the line-side terminal to a direct current (DC) power output at the load side terminal. One or more DC devices may be coupled to the DC power output at the load side terminal.

20 Claims, 8 Drawing Sheets

(58) Field of Classification Search
CPC ....... H01H 2009/543; H01H 2009/544; H01H 2071/006; H01H 2083/201; H01H 2223/002; H01H 2300/044; H01H 71/02; H01H 71/025; H01H 71/08; H01H 71/10; H01H 83/00; H01H 85/34; H01H 89/00; H01H 9/0264; H01H 9/042; H01H 9/046; H01H 9/168; H01H 9/26; H01H 9/281; H01H 9/52; H01H 9/542; H01H 9/548; H02H 1/0007; H02H 3/006; H02H 3/027; H02H 3/05; H02H 3/08; H02H 3/083; H02H 3/093; H02H 3/0935; H02H 3/20; H02H 5/04; H02H 5/047; H02H 7/226; H02H 7/228; H02H 9/001; H02H 9/008; H05B 45/3725; H05B 45/56; H05K 5/069; H05K 7/20; Y02B 20/30

See application file for complete search history.

(56) References Cited

U.S. PATENT DOCUMENTS

| | | |
|---|---|---|
| 11,239,652 B2 | 2/2022 | Manahan et al. |
| 11,270,854 B2 | 3/2022 | Manahan et al. |
| 11,303,111 B2 | 4/2022 | Butler et al. |
| 11,456,142 B2 | 9/2022 | Manahan et al. |
| 11,615,925 B2 | 3/2023 | Manahan et al. |
| 2013/0058140 A1 | 3/2013 | Victor et al. |
| 2014/0054025 A1* | 2/2014 | DeCarr ............... H05K 7/20945 236/94 |
| 2014/0268564 A1 | 9/2014 | Sagneri et al. |
| 2016/0089988 A1 | 3/2016 | Bartz et al. |
| 2017/0256934 A1 | 9/2017 | Kennedy et al. |
| 2018/0366936 A1 | 12/2018 | Kennedy et al. |
| 2019/0103742 A1 | 4/2019 | Kennedy et al. |
| 2019/0341213 A1* | 11/2019 | Kouroussis ........ H01H 71/1081 |
| 2020/0211791 A1* | 7/2020 | Manahan ................ H05K 7/20 |
| 2020/0211792 A1* | 7/2020 | Manahan ............... H01H 71/10 |
| 2020/0211803 A1* | 7/2020 | Manahan ............. H01H 71/025 |
| 2020/0212666 A1* | 7/2020 | Manahan ............. H01H 1/5866 |
| 2020/0212670 A1* | 7/2020 | Butler ................. H01H 71/025 |
| 2021/0120693 A1* | 4/2021 | Namuduri ............. H01L 23/24 |
| 2022/0407304 A1* | 12/2022 | Butler ................. H02H 1/0007 |

FOREIGN PATENT DOCUMENTS

| | | |
|---|---|---|
| CN | 106604475 A | 4/2017 |
| EP | 2 707 937 B1 | 7/2015 |

OTHER PUBLICATIONS

International Search Report and Written Opinion of the International Searching Authority for International Patent Application No. PCT/EP2021/025030 mailed Apr. 13, 2021, 12 pages.

Supplemental Written Opinion for Application No. PCT/EP2021/025030 mailed Dec. 13, 2022.

* cited by examiner

CIRCUIT PROTECTION DEVICE AND SYSTEM WITH POWER SUPPLY CONVERSION AND CONTROL FOR DC LOADS

This application is a National Stage Application of PCT/EP2021/025030, filed 27 Jan. 2021, which claims benefit of German Patent Application Serial No. 102020102399.5, filed 31 Jan. 2020, and which applications are incorporated herein by reference. To the extent appropriate, a claim of priority is made to each of the above-disclosed applications.

BACKGROUND OF THE INVENTION

The field of the invention relates generally to circuit protectors for an electrical power system, and more specifically to a hazardous environmental compliant circuit protection device including power supply conversion and control for DC loads.

BRIEF DESCRIPTION OF THE INVENTION

Circuit protection devices exist to satisfy the needs of electrical power systems providing electrical power to various electrical loads. Certain types of electrical loads, such as, for example, light emitting diodes (LED) luminaires require direct current (DC) power at a predetermined voltage and current to operate. In known lighting applications, for example, a plurality of LED luminaires may be arranged and connected in series within a hazardous location, such as an industrial facility, wherein ignitable gas, vapors or substances may be airborne. Reliable operation of such DC loads, including but not necessarily limited to LED lighting devices, is an important safety consideration in hazardous environments.

Various types of lighting fixtures utilizing LEDs have been developed for numerous types of commercial and industrial environments. Conventionally, lighting devices such as LED luminaires include an integrated power converting circuit, such that an alternating current (AC) power supply is converted to the desired DC voltage and current within each individual LED luminaire. Such power converting circuits integrated with each individual LED luminaire are disadvantaged, however, in that they render the LED luminaires inherently susceptible to heating and environmental conditions that limit their lifespan and reliability posing particular challenges to their use and enjoyment in hazardous locations.

Typically, each series-connected LED luminaire is further protected by a circuit protection device such as a circuit breaker in the hazardous environment. Solid state circuit breakers may be particularly well suited for applications in hazardous locations to limit energy supplied to the electrical loads in the hazardous environment and prevent possible sources of ignition of combustible elements in the ambient environment. Further, solid state circuit breakers may be advantageously digitally controlled, allowing a user to adjust the output power to electrical loads and/or adjust the limits of the solid state circuit breaker to customize circuit protection capability for specific electrical loads.

Conventional solid state circuit breakers are limited in some aspects to power DC electrical loads such as LED luminaires. Improvements in circuit protectors and in LED luminaires, amongst other possible DC load devices, are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
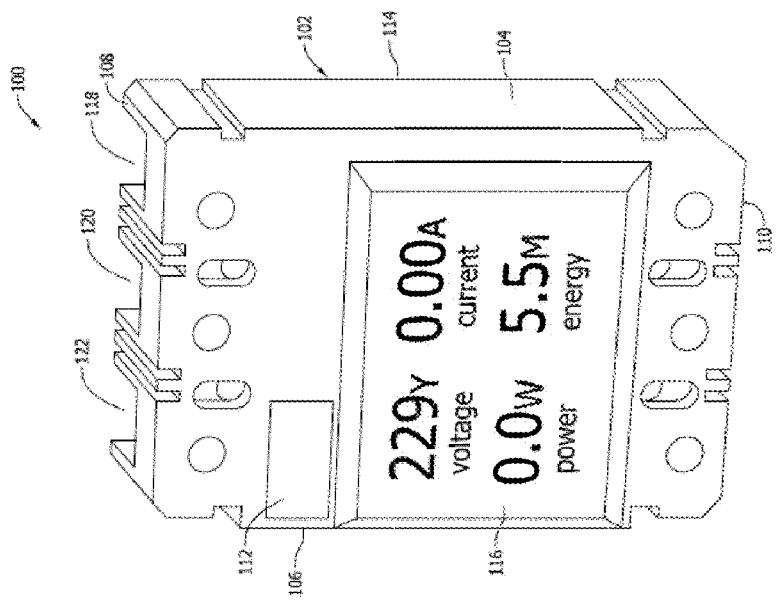
FIG. 1 is a perspective view of a compliant, hazardous location arc-less circuit device according to a first exemplary embodiment of the invention.

In order to understand the inventive concepts described herein to their fullest extent, some discussion of the state of the art and certain problems and disadvantages concerning hazardous environment compliant circuit protection devices with respect to certain types of DC loads is warranted. Such DC loads may include, but are not necessarily limited to a plurality of light emitting diodes (LED) luminaires arranged within a hazardous location and connected in-line or in series to one another.

Electrical power systems sometimes operate within hazardous environments presenting a risk of explosion via ignition of a surrounding gas or vapor dusts, fibers, or flyings. Such hazardous environments may arise in, for example only, petroleum refineries, petrochemical plants, grain silos, wastewater and/or treatment facilities, among other industrial facilities in which sustained or volatile conditions in the ambient environment may be present and may present a heightened risk of fire or explosion. An occasional or continuous presence of airborne ignitable gas, ignitable vapors or ignitable dust, or otherwise flammable substances presents substantial concerns regarding safe and reliable operation of such facilities overall, including, but not limited to, safe operation of the electrical power system itself, which in some instances by virtue of conventional circuit protector devices may produce ignition sources in normal operation and in the presence of an electrical fault. As such, a number of standards have been promulgated relating to electrical product use in hazardous environments to improve safety in hazardous locations in view of an assessed probability of explosion or fire risk.

For example, Underwriter's Laboratories ("UL") standard UL1203 sets forth Explosion-Proof and Dust-Ignition-Proof Electrical Equipment criteria for hazardous locations. Explosion-Proof and Dust-Ignition-Proof enclosures are presently available to enclose or contain electrical products, including but not necessarily limited to circuit protection devices that are not themselves Explosion-Proof or Dust- Ignition-Proof. In combination with appropriate Explosion-Proof and Dust-Ignition-Proof enclosures, electrical equipment manufacturers may receive UL certification of compliance with the applicable rating standards for hazardous locations, and UL certification is an important aspect of a manufacturer's ability to successfully bring products to market in North America or any other market accepting of standard UL1203.

The National Electric Code (NEC) Article 500 sets forth a hazardous location coding system, and the NEC generally classifies hazardous locations by class and division. Class I locations are those locations in which flammable vapors and gases may be present. Class II locations are those in which combustible dust may be found. Class III locations are those locations which are hazardous because of the presence of easily ignitable fibers or flyings. Class I, Division 1 covers locations where flammable gases or vapors may exist under normal operating conditions, under frequent repair or maintenance operations, or where breakdown or faulty operation of process equipment might also cause simultaneous failure of electrical equipment. Class I, Division 2 covers locations where flammable gases, vapors or volatile liquids are handled either in a closed system, or confined within suitable enclosures, or where hazardous concentrations are normally prevented by positive mechanical ventilation. Areas adjacent to Division 1 locations, into which gases might occasionally flow, would also be Division 2. Similar divisions are defined in the NEC for the remaining classes.

The International Electrotechnical Commission (IEC) likewise categorizes hazardous locations into Zone 0, 1, or 2 representing locations in which flammable gases or vapors are or may be airborne in an amount sufficient to produce explosive or ignitable mixtures. As defined in the IEC, a Zone 0 location is a location in which ignitable concentrations of flammable gases or vapors are likely to exist under normal operating conditions; or in which ignitable concentrations of flammable gases or vapors may exist frequently because of repair or maintenance operations or because of leakage; or in which equipment is operated or processes are carried on, of such a nature that equipment breakdown or faulty operations could result in the release of ignitable concentrations of flammable gases or vapors and also cause simultaneous failure of electrical equipment in a mode to cause the electrical equipment to become a source of ignition; or that is adjacent to a Zone 1 location from which ignitable concentrations of vapors could be communicated.

While expressed a bit differently, IEC Zone 1 and NEC Division 2, in practice, generally converge to common locations in the assessment of hazardous environments. In view of modern environmental regulation and the concentrated nature of Division 1 and Zone 0 applications, most hazardous equipment, particularly switch gear products of an electrical power system, are installed for use in Division 2 or Zone 1 (or 2) areas. Given that electrical devices, such as those described below, can be ignition sources in certain circumstances, explosion-proof, flame-proof, or ignition proof enclosures are conventionally provided in NEC Division 2 locations and/or IEC Zone 1 locations to house electrical devices that otherwise pose possible ignition risk. The terms "explosion-proof" or "flame-proof" in this context, refer to enclosures that are designed to be capable of containing an internal explosion of a specified flammable vapor-air mixture. In addition, explosion-proof or flame-proof enclosures must operate at a safe temperature with respect to the surrounding atmosphere.

Available explosion-proof, flame-proof or ignition-proof enclosures are effective to provide safe operation of mechanical switch devices in the NEC Division 1 or 2 location or an IEC Zone 1 location, but generally impart additional costs, occupy valuable space in the electrical power system, and impose certain burdens to the installation and servicing of an electrical power system over time. Obtaining access to the disconnect devices inside the explosion-proof enclosures typically requires a time-consuming removal of a number of fasteners, and after any maintenance procedures are completed all the fasteners must be properly replaced to ensure the desired safety of the explosion-proof enclosure. During maintenance procedures, the area in which the disconnect devices are located are also typically decommissioned (i.e., disconnected) with associated load-side processes shut down to ensure safety during the maintenance procedure. Such decommissions are costly from the perspective of the industrial facility, and limiting or shortening decommissioned downtime is important. It would therefore be desirable in some cases if the explosion-proof enclosures could be eliminated in NEC Division 1 or 2 location or an IEC Zone 1 location while still providing safe disconnect functionality in a hazardous environment. In order to do so, circuit protection devices designed to reduce ignition risks are needed, but at present generally do not exist.

Solid state disconnect devices are known that provide desirable disconnect functionality via semiconductor switches or semiconductor devices such as, but not limited to, insulated-gate bipolar transistors (IGBTs), Metal Oxide Semiconductor Field Effect Transistors (MOSFETs) and other known elements that electronically operate in a known manner to preclude current flow through the device and therefore electrically isolate line-side circuitry from load-side circuitry in response to predetermined circuit conditions without utilizing mechanical switch contacts. Such solid state switches may be implemented in circuit breaker devices or used in combination with fuses to address electrical fault conditions in an automatic manner.

Solid state switches beneficially eliminate electrical arcing associated with displacement of mechanical switch contacts as described above, but nonetheless may still present possible ignition sources via heat generated by the solid state switches in use. Depending on the type and concentration of combustible elements in the hazardous location, the surface temperature of the solid state switch devices may rise to the point where spontaneous ignition may occur due to the flash temperature of the specific gas or ignitable substance in the hazardous location, even though no arcing occurs in the switching operation of the device.

So-called hybrid disconnect devices are also known that include a combination of semiconductor switches or semiconductor devices and mechanical switch contacts. Such hybrid devices may likewise be implemented in circuit breaker devices or used in combination with fuses to address electrical fault conditions in an automatic manner. Hybrid disconnect devices present a mix of the issues discussed above from the perspective of possible ignition sources in a hazardous location, and adequate safety in the absence of a complementary use of an explosion-proof enclosure in an NEC Division 2 or IEC Zone 1 location cannot be ensured.

LED luminaires and LED lighting devices, among other types of electrical load devices, are available which feature heavy duty materials and construction to meet the desired safety needs and demands for safe operation in hazardous environments such as those described above. More specifically, LED light fixtures, including so-called luminaires, have been developed for lighting tasks in harsh and hazardous environments, such as being designed to be explosion-protected. Such lighting fixtures are constructed to be shock-resistant and vibration resistant with no filament or glass to break, for immediate start with instant full illumination, no lifetime reduction due to switching cycles, and reduced disposal costs.

In addition to hazardous locations discussed above, so-called harsh locations also require specific focus in the design of light fixtures used therewith. Harsh locations may entail corrosive elements and the like in the atmosphere that are not necessarily explosive and/or are subject to temperature cycling, pressure cycling, shock and/or mechanical vibration forces that are typically not present in non-harsh operating environments. Of course, some locations in which LED lighting fixtures are desirably employed are both harsh and hazardous by nature, and are therefore heavy duty fixtures designed to withstand various operating conditions that more typical lighting features for other uses could not withstand.

Conventional LED luminaires or LED lighting devices, whether for harsh and hazardous location use or non-harsh and non-hazardous location use typically include integrated power converting circuitry that converts an input alternating current (AC) power supply source to an output direct current (DC) within each individual LED luminaire for powering the illumination thereof. In some cases, many LED luminaires may be connected in series within a hazardous location, with each and every individual luminaire including power converting circuitry. Over a large number of such devices, the costs of the integrated power converters in each device can be a substantial component of the cost of installing LED lighting systems in a large facility.

Also, reliable operation of such LED luminaires is an important safety consideration in the normal operation of an industrial facility, as well as in emergency situations, yet the integrated power converters in the device are prone to reliability issues that may negatively affect the desired operation of the LEDs (e.g., dimness or flickering of the LEDs) or the power converters may simply fail and render the LEDs completely inoperative. Because the power converter circuit is integrated into the device, the entire LED device must be replaced In view of the above, simpler and more cost effective LED luminaires and lighting fixtures for harsh and hazardous environments which are simpler and cheaper to manufacture are therefore desired that may more flexibly meet the needs of different installations. Cost reduction and reliability improvements are needed to meet longstanding and unfulfilled needs in the marketplace, particularly for circuit protectors supplying output power to DC electrical loads operating in harsh and hazardous environments.

These and other disadvantages in the art are overcome via a circuit protection device in embodiments described herein, which includes a load controller having power converting circuitry which operates to convert an AC power supply input from a line-side terminal to a DC power output at a load-side terminal. Accordingly, DC electrical loads such as LED luminaires connected to the DC power output of the load side-terminal do not require conventional power converting circuitry integrated into the design of the LED luminaire. By eliminated such integrated power converters, LED luminaries may be manufactured at a reduced cost compared with conventional LED luminaires.

More specifically, electrical power conversion and control is integrated into a circuit protector device such as a solid state circuit breaker device and/or a hybrid circuit breaker device, eliminating any need for LED luminaires to include power converter or control elements. As such, the inventive circuit breaker may output a controlled DC power to each series connected LED luminaires in addition while simultaneously providing circuit protection to all of the connected LED luminaires. Further, the electrical power conversion and control features of the circuit breaker may be selectively adjusted to output DC power at optimal levels for different DC electrical loads including different types of LED luminaires and non-LED electrical loads for safe operation within a hazardous location.

Exemplary embodiments of circuit protection devices are described herein that specifically address safety needs and requirements for compliance with the applicable standards in NEC Division 1 or 2 location or an IEC Zone 1 or 2 location without necessarily requiring a separately provided explosion-proof, flame-proof or ignition-proof enclosure for the circuit protector. As such, and via the elimination of separately provided explosion-proof, flame-proof or ignition-proof enclosures, the exemplary circuit protection devices described herein may be implemented in an electrical power system at reduced cost and in a reduced amount of space in electrical panels, control centers, and the like. The exemplary circuit protection devices described herein may be provided in a modular and configurable system that facilitates a more economical installation, maintenance and oversight of the electrical power system in a harsh and hazardous location. Method aspects will be in part explicitly discussed and in part apparent from the following description.

While the following discussion is made in the context of circuit breaker devices supplying electrical power to DC loads such as LED lighting devices, the inventive concepts below are not necessarily limited to LED lighting devices and instead may broadly accrue to other types of DC load devices that present similar issues. Likewise, while the inventive concepts are described in the context of hazardous locations such as NEC Division 1 and 2 locations or IEC Zone 1 or 2 locations, the benefits of the concepts described are not necessarily limited to NEC Division 1 or 2 locations or IEC Zone 1 or 2 locations and instead may more broadly apply to other types of hazardous environments, and in some aspects may be beneficially provided for use in non-hazardous locations as desired.

FIG. 1 is a perspective view of a compliant, hazardous environment circuit protection device 100 according to a first exemplary embodiment of the invention. The circuit protection device 100 has a housing 102 having opposing longitudinal sides 104, 106 and opposing lateral sides 108, 110 arranged orthogonally with respect to the longitudinal sides 104, 106. The housing 102 also includes a front side 112 and a rear side 114. The front side 112 may include an optional digital display 116 that functions as a user interface for the circuit protection device 100. As shown, display 116 visually indicates voltage, current, power and energy readings to a person in the vicinity of the circuit protection device 100 and display 116. The housing 102 of the circuit protector device 100 is fabricated from strategically selected or otherwise custom formulated material (or materials) to withstand all possible electrical operating conditions, and specifically all possible electrical fault conditions including simultaneous fault conditions that may be presented by electrical power systems being protected in a NEC Division 1 or 2 location or an IEC Zone 1 or 2 location For compliance in an NEC Division 1 location or an IEC Zone 1 or 2 location, the housing structure and housing material must likewise be further formulated to provide adequate strength to withstand shock and impact forces that may be realized in an explosive environment, as well as to provide chemical resistance to withstand exposure to chemicals in the explosive environment that could otherwise negatively impact the integrity of the device 100. As used herein, "chemical resistance" refers to the strength of the housing material to protect against chemical attack or solvent reaction. Chemical resistance in the housing 102 is the opposite of chemical reactivity that may cause an undesirable chemical effect when the housing 102 is exposed to certain chemicals and/or that my undesirably generate heat and raise the temperature of the housing 102. Chemical resistance, via little or no reactivity to specified chemicals, relates to the resistivity of the housing 102 to corrosive or caustic substances in the environment, including but not limited to airborne gases and vapors. For the device 100, chemical resistance is important to all materials and structure that contributes to the hazardous location compliance described herein.

UL 1203 defines chemical testing that may be applied to determine whether any formulation of a candidate material for the housing 102 is chemically resistant for explosive environment locations. Specifically, UL 1203 chemical testing requires sample housings to be fabricated from the formulation of candidate material in the housing structure desired, and a lengthy exposure of the sample housings to saturated vapors in the air including a number of specified chemicals for a predetermined period of time. The specified chemicals for UL 1203 chemical testing include acetic acid, acetone, ammonium hydroxide, ASTM reference fuel C, diethyl ether, ethyl acetate, ethylene dichloride, furfural, n-hexane, methyl ethyl ketone, methanol, 2-nitropropane, and toluene. Different sample housings are exposed to each chemical for a predetermined period of time, and after exposure to each chemical, the sample housings are inspected to ensure that the housing structure of the samples is not compromised or shows signs of degradation via, for example, discoloration, swelling, shrinking, crazing, cracking, leaching, or dissolving. Sample housings that pass inspection are then subjected to a crush test and compared to the results of crush testing prior to the chemical exposure. If the crushing force of the chemically tested sample housings shows that the chemically tested sample housings withstand at least 85% of the corresponding crush force as tested prior to the chemical exposure, the sample housings are UL 1203 compliant.

The housing 102, via the material from which it is fabricated, should likewise exhibit chemical compatibility with specific chemicals present in a given NEC Division 1 or 2 location or an IEC Zone 1 or 2 location. Chemical compatibility refers to the stability of the housing when exposed to substances in the hazardous location environment. If the housing 102 chemically reacts to a substance in the environment, it is considered incompatible. Accordingly, compatibility testing is nonetheless advisable to confirm chemical compatibility in view of the number of different corrosive or caustic chemicals and substances used across the spectrum of industrial facilities. Different facilities involving different caustic or corrosive substances may demand housings of different materials to address issues presented. Strategic selection and custom formulation of housing materials may be needed for some explosive environments if a universally optimal housing or material formulation cannot be practically determined or economically provided. In some cases, UL 1203 compliance for the housing may obviate a need for chemical compatibility testing in selected facilities, and chemical compatibility testing may accordingly be considered optional.

The material used to fabricate the housing 102 may likewise be strategically selected or otherwise formulated, as well as formed with specific structure, to achieve thermal management and surface temperature goals for the device 100 in operation. Some housing materials may exhibit better thermal performance to distribute and dissipate heat than other materials. For example, specific polymeric resins may be selected or customized, and formulated or processed to realize a housing 102 that will improve thermal performance of the device 100 in use when protecting the electrical power system, both internally to the housing 102 and on its outer surface area such that the outer surface area temperature is maintained at a level below the temperature which could cause ignition in an NEC Division 1 or 2 location or an IEC Zone 1 or 2 location.

For any given housing material, the shape and form factor of the housing 102, including dimensions, contours, etc. may vary the overall thermal performance and surface temperature positively or negatively. For instance, for a given device rating and operating voltage and current of the electrical power system, a housing having a larger outer surface area will generally reduce surface temperature in use as compared to a housing having a smaller outer surface area. The housing structure can be designed to optimize and balance overall package size and configuration with thermal performance.

In some embodiments, the housing 102 may be fabricated from metal or metal alloys, non-metallic insulative materials such as high strength, high performance plastics, or combinations of metallic and non-metallic materials to vary thermal performance and the other considerations above, namely impact resistance and chemical resistance. Encapsulated housing constructions, in whole or in part, are likewise possible. In some instances, the interior of the housing 102 may likewise be filled in whole or in part with dielectric material, dielectric fluid, potting materials, or other filler media such as sand to contain, absorb or dissipate heat and energy of energized electrical conductors and switch components in the device 102 to unsure that the surface temperature of the housing 102 will remain below a selected target temperature to provide a device 100 having a desired temperature classification or temperature rating.

Apart from the materials utilized in its fabrication, the structure of the housing 102 could likewise be designed with heat distribution and dissipation in mind. The housing can be structured strategically to include more than one housing material throughout or at specifically targeted locations in the housing 102. Housing sub-structures could be independently fabricated and provided for assembly to provide additional thermal insulation or thermal conductivity in desired areas of the housing to selectively confine and distribute heat in a strategic manner in select locations. Wall thickness of the housing 102 could likewise be varied to provide greater or lesser degrees of thermal conductivity and heat dissipation in selected portions of the structure or in certain areas of the housing structure at the most desirable locations. Piping, channels, or pockets may be formed to strategically capture generated heat and direct it more efficiently to desired locations for dissipation. Heat sink materials and the like may be included to improve thermal absorption and dissipation. Active cooling elements are likewise possible in which cooling fluids are passed over or through the housing structure, with the housing structure including appropriate structure to facilitate active cooling.

In contemplated embodiments, active cooling elements could be self-contained or separately provided such as in a panelboard application where a number of devices 100 may be provided, with an active cooling system countering the cumulative generation of heat in closely positioned devices 100 and alleviating temperature effects that the devices 100 may have upon one another. The active cooling system may include cooling fans or pumps which circulate fluids in or around a number of devices 100 to effectively manage surface temperatures. Devices 100 including temperature sensors 158 (FIG. 3) may provide feedback signals to an active cooling system to power on when needed and otherwise be powered off. Thermal electrics may also be deployed as may feedback loops with the DC load equipment to reduce available current through the device (thereby reducing heat).

The above thermal management considerations may be pursued in various different combinations, some of which may counteract or obviate a need for other of the considerations. For example, active cooling in some applications may obviate a need for certain features of the housing described, such as a more sophisticated shape and form factor to dissipate heat over a relatively complex surface area.

The lateral sides 108, 110 of the housing 102 each include connection recesses 118, 120, 122 for respective connection to line-side and load-side circuitry. In the example shown in FIG. 1, three connection recesses 118, 120, 122 are provided for respective connection to a three phase power supply, i.e., an alternating current (AC) power supply, on one of the sides 108, 110 and to a direct current (DC) load device, on the other. The device 100 as shown is configured as a circuit breaker having at least one solid state switching element and a load controller with power converting circuitry. Accordingly, the device 100 is a multipurpose circuit protection device that provides automatic circuit protection in response to predetermined overcurrent conditions and converts the AC power supply from a line-side terminal to a controlled DC power output at a load-side terminal.

In contemplated embodiments, specific response characteristic to overcurrent conditions and adjustments in the DC power output may be selected by the user within a certain range input to the device 100 via the display screen 116, via another user interface including a remote interface, and/or pre-programmed into the device 100. The device 100 may operate according to specified time-current curves or trip profiles suitable to provide adequate protection for connected loads.

The display 116 may be multi-functional to display different screens in response to user activation. In some embodiments the display 116 may be touch sensitive with the user making selections via touching selected areas of the display as prompted. Input selectors such as buttons, knobs, etc. may be separately supplied from the display 116 for interactive by a user in relation to the display. An input selector such as a toggle switch may also be provided separately from the display 116 to serve as manually operable on/off switches that may intuitively be manually operated by a user. In this case, the toggle switch may emulate a traditional toggle switch to affect a change of state to "on" or "off", it may do so without displacement of mechanical switch contacts because, as explained below, the device 100 does not include mechanical switches. Alternatively, an on/off feature may be built into the display 116 for convenient use by an operator to achieve disconnect switch functionality to connected load side equipment.

The display 116 may be multi-functional to display different screens in response to user activation. In some embodiments the display 116 may be touch sensitive with the user making selections via touching selected areas of the display as prompted. Input selectors such as buttons, knobs, etc. may be separately supplied from the display 116 for user input in relation to prompts or information presented on the display 116. It is recognized, however, that the display or array of displays 116 can be considered optional in certain embodiments and need not be included at all. In further embodiments, additional input/output elements may be provided, whether in the form of a display or other interfaces for user interaction with the device both locally and remotely.

Figure 2:
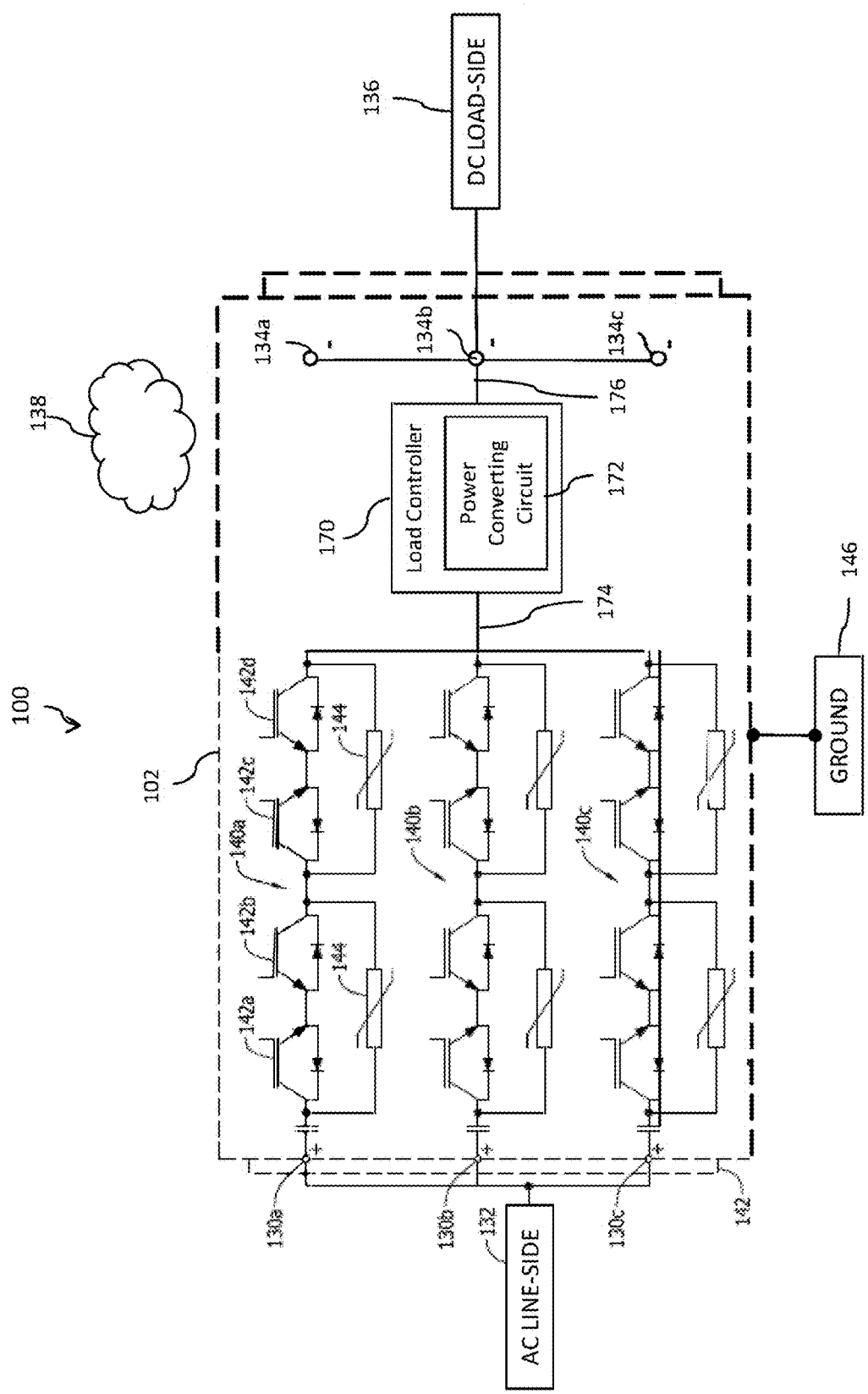
FIG. 2 is a simplified schematic diagram of the circuit protection device shown in FIG. 1 in an exemplary solid state configuration.

FIG. 2 is a simplified schematic diagram of the circuit protection device 100 in an exemplary solid state configuration. The device 100 includes input terminals 130*a*, 130*b*, 130*c* each connected to one phase of a three phase power supply, i.e., an AC power supply, indicated as AC line-side circuitry 132 in FIG. 2 via connecting cables, conduits, or wires. The device 100 further includes output terminals 134*a*, 134*b*, 136*c* each connected to a DC load-side circuitry 136. DC load side-circuitry 136 may include one or more of a LED luminaire or other lighting devices, motors, fans, and other electrical equipment that requires a DC power supply. The DC load-side circuitry 136, as well as the circuit protector 100, may be located in hazardous locations, for example in an industrial facility, where ignitable gas vapors or substances may be airborne as indicated at 138. The output terminals 134*a*, 134*b*, 136*c* may be connected to the DC load-side circuitry 136 via connecting cables, conduits, or wires. Optionally, the device 100 may further include additional elements such as auxiliary contacts and auxiliary connections, shunt trip features, undervoltage release features, communication ports and communication elements, power ports for communication and other purposes, etc.

In between each pair of input terminals 130*a*, 130*b*, 130*c* and output terminals 134*a*, 134*b*, 136*c* are solid state switch devices arranged as indicated at 140*a*, 140*b* and 140*c*. The exemplary arrangement includes series connected pairs of insulated-gate bipolar transistors (IGBTs) 142*a*, 142*b*, 142*c*, 142*d* respectively connected in reverse to one another, with each pair of IGBTs 142*a* and 142*b* and 142*c* and 142*d* including a varistor element 144 connected in parallel to the IGBTs. The reversed connected IGBTs in each pair precludes reverse current flow through the IGBTs from the DC load-side circuitry 136 to the AC line-side circuitry 132 in a known manner.

In addition, in between each pair of line-side input terminals 130*a*, 130*b*, 130*c* and load-side output terminals 134*a*, 134*b*, 134*c*, is a load controller 170 having power converting circuitry 172. The load controller 170 includes a load controller input 174 and a load controller output 176. The load controller output 176 generates a controlled DC power supply for power a DC electrical load device. In the embodiment illustrated in FIG. 2, the load controller output 176 is coupled to one or more of the output terminals 134*a*, 134*b*, and 134*c*. Accordingly, one or more of output terminals 134*a*, 134*b*, and 134*c* supplies a DC power output to DC load-line circuitry 136.

The load controller input 174 of load controller 170 is connected to an AC power supply. As such, the power converting circuitry 172 operates to convert the AC power supply at the load controller input 174 to the DC power output at the load controller output 176. In the embodiment illustrated in FIG. 2, the load controller input receives the AC power supply from at least one of solid state switch 140*a*, 140*b*, and/or 140*c*. In some embodiments, the load controller input 174 may instead receive the AC power supply directly from the AC line-side circuitry 132. Additionally, while one load controller 170 is shown in FIG. 2, multiple load controllers 170 may alternative be provided to supply output power to the same or different DC load devices connected to the load-side terminal (or terminals) of the device 100.

The load controller 170 may vary the DC power level of the load controller output 176 according to one of plurality of user-selected settings which may be selected by the user within a certain range input to the device 100 via the display screen 116, via another user interface including a remote interface, and/or pre-programmed into the device.

The IGBTs 142a, 142b, 142c, 142d are one form of a semiconductor switch that is operable to either permit current flow between the respective input and output terminals 130a and 134a, 130b and 134b, and 130c and 134c from the AC line-side circuitry 132 to the DC load-side circuitry 136 or to preclude current from flowing through the device 100 such that the DC load-side circuitry 136 becomes electrically isolated from the AC line-side circuitry 132. Briefly, a positive voltage applied from the emitter to gate terminals of the IGBT causes electrons to be drawn toward the gate terminal across a body region thereof. If the gate-emitter voltage is at or above a threshold voltage, enough electrons are drawn toward the gate to form a conductive channel across the body region, allowing current to flow from the collector to the emitter. If the gate-emitter voltage is below the threshold voltage essentially no current can flow across the body region, such that by controlling the gate-emitter voltage current flow between the input and output terminals may be enabled or disabled to connect or disconnect the output terminals from the input terminals of the device 100 via the IGBTs. Equivalent types of semiconductor switch elements other than IGBT elements may likewise be employed, including, but not limited to, Metal Oxide Semiconductor Field Effect Transistor (MOSFET) elements, bipolar transistor elements, silicon controlled rectifier elements (sometimes referred to as thyristors), and the like. The number of semiconductor switch elements may be varied to be greater or less than the number shown in FIG. 2.

The varistor elements 144, connected in parallel to each pair of IGBTs in the arrangement shown, exhibit a relatively high resistance when exposed to a normal operating voltage, and a much lower resistance when exposed to a larger voltage, such as is associated with over-voltage conditions and/or electrical fault conditions. The impedance of the current paths through the varistors 144 are substantially lower than the impedance of the IGBTs when the varistors 144 operate in a low-impedance mode, and is otherwise substantially higher than the impedance of the IGBTs. This means that in normal conditions the high impedance of the varistors 144 causes all of the current to flow through the IGBTs, but as over-voltage conditions arise the varistors 144 switch from the high impedance mode to the low impedance mode and shunt or divert over-voltage-induced current surges away from the IGBTs to the load-side 136. As over-voltage conditions subside, the varistors 144 may return to a high impedance mode. The varistors 144 beneficially allow, for example, motor inrush currents to flow through the device 100 while otherwise permitting the IGBTs to respond to overcurrent conditions after motor starting is complete. In other applications, however, the varistors may be considered optional and may be omitted.

As a further thermal management feature, the solid state switch devices (e.g., the IGBTs) in each arrangement 140a, 140b and 140c may be encapsulated with a strategically selected or otherwise formulated material to improve thermal performance of the switch devices 140a, 140b and 140c and/or improve heat dissipation and distribution in use. The encapsulation material of the solid state switch devices 140a, 140b and 140c may be the same or different from encapsulation materials included in the housing construction, and specifically are targeted to control or limit the operating temperature of the silicon in the solid state switch devices in normal circuit operation or in overcurrent conditions and electrical fault conditions to prevent overheating of the switch devices themselves or overheating of the housing 102.

While exemplary solid state switching arrangements are shown and described, others are possible to achieve solid state switching functionality in an arc-less manner. As discussed above, the solid state switching devices avoid the type of arcing that mechanical switches produce, and therefore avoid such arcing from being a possible ignition source in NEC Division 1 or 2 locations or IEC Zone 1 or 2 locations.

In view of the hazardous environment in which the device 100 is to be used, reliable termination of AC line-side and DC load-side cables to the input and output terminals is important as loose connections can generate heat and reliability issues, as well as possible ignition concerns in a hazardous location. In an NEC Division 2 or IEC Zone 1 or 2 location, the input and output terminals may be accessible from the exterior of the housing 102. Locking terminal connection assemblies and spring-biased terminal assemblies may be utilized to accept and retain ends of the respective cables, while reducing any tendency of the cable connections to loosen over time. Depending on the specific end use of the device 100 and its operating conditions, such locking terminal assemblies and spring-biased terminal connectors may, however, be considered optional in NEC Division 2 or IEC Zone 1 or 2 locations.

In an NEC Division 1 location, the input and output terminals may further be enclosed in additional housing portions to provide additional safety assurance. Such housing portions may be separately provided from the housing 102 or may be integrally formed as extensions of the housing 102 to isolate the input and output terminals from the explosive environment. In contemplated embodiments, removable cover elements may be provided to access the input and output terminals and complete electrical connections to the input and output terminals inside the enclosures of the housing portions. The AC line-side and DC load-side cable connections may further be established, for example, via armored cable and cable glands providing ingress protection, sealing and grounding to safely pass a line-side cable or load-side cable through the enclosures of each housing portion. When used with armored cable, a ground to earth path may be established via the cable gland. Armored cable is not necessary in all embodiments, however, and may not be used. Cable glands may be used with non-armored cable as well.

The housing 102 may be designed and fabricated with thermal management issues in mind to maintain surface temperatures below applicable limits for a given installation in an NEC Division 1 location, and in some embodiments the housing 102 may in whole or in part be explosion-proof in compliance with applicable standards for hazardous locations, albeit with relatively smaller and more economical housing to provide than a conventional, larger and separately provided explosion-proof enclosure that would conventionally contain the entire circuit protection device. The housing 102 and any enclosures defined therein may likewise include vacuum chambers or may filled with dielectric fluid, dielectric material or inert gas to reduce or impede electrical arcing at the terminal/cable interface or at other locations in the housing.

To address possible static electricity charge buildup, which presents a possible ignition source in an NEC Division 1 location, the housing 102 is shown in FIG. 2 with connection to electrical ground 146. Briefly, static electricity is the result of an electromagnetic imbalance between negative and positive charges in an object. Charging of the housing surface may arise via surface charge involving another object, particularly for insulative portions of the housing, or via charge induction for electrically conductive portions of the housing. Surface charging can also occur during exposure to a high voltage DC power supply, which will cause ions to adhere to the housing surface.

Regardless of how surface charging actually arises, the connection to ground 142 allows any electrical charge buildup on the housing 102 to safely dissipate without creating an ignition source in combustible/hazardous areas. The housing 102 may be grounded to earth ground or chassis ground via a line wire or line conductor connected to the housing 102 on its outer surface. As such, any charging of the exterior of the housing 102 will be quickly dissipated as electrical current to ground and obviate a high voltage discharge event, typically via a spark or shock that could be generated by a person or tool utilized by a person that could otherwise occur in the presence of the explosive atmosphere and cause ignition.

The housing 102 itself could also be fabricated in whole in part from antistatic polymers or antistatic materials that are weakly conductive to electricity from the perspective of charge buildup, but nonetheless considered insulative and non-conductive from the perspective of the electrical power system that the device 100 is protecting. Antistatic materials may improve the housing performance relative to non-antistatic materials by reducing any tendency of the housing to charge in the first instance, and this is another consideration for strategically selecting or otherwise formulating the material(s) to be utilized in the housing fabrication. Antistatic coatings, encapsulants, or shells may be provided on the housing outer surface if desired, although chemical resistance and compatibility must still be ensured as discussed above. When the device 100 directly connects to an enclosure/system ground plane in an actual installation, dedicated ground conductors to address static electricity issues may not be necessary due to mechanical attachment and/or physical proximity to the ground plane.

While a single ground connection is shown in FIG. 2, more than one ground connection could be provided in the structure of the device 100 at any desired location. Grounding conductors may be provided interior to the device housing 102 in addition to or in lieu of a grounding conductor connecting to the exterior of the device housing 102 as described. Ground connections for the housing 102 also could be established via a cable connector such as a cable gland when armored cable that already includes a ground path to earth is utilized to make the line-side and load-side connections to the terminals 130a, 130b, 130c of the device 100. Of course, in some cases, non-armored cable could be used, with or without cable glands, while still eliminating ignition sources in the device 100 and addressing static electricity with an alternative ground connection.

In NEC Division 2 or IEC Zone 1 or 2 locations, the device 100 would typically be protected by an enclosure and therefore would not be as prone to static electricity issues and discharge events. As such, the connection to ground 146 may or may not be necessary or desirable in a device 100 for use in an NEC Division 2 location or IEC Zone 1 location and could therefore be considered optional. By virtue of the device 100, however, the enclosure containing one or more devices 100 need not be explosion-proof and the conventionally provided explosion-proof enclosure may be omitted.

Figure 3:
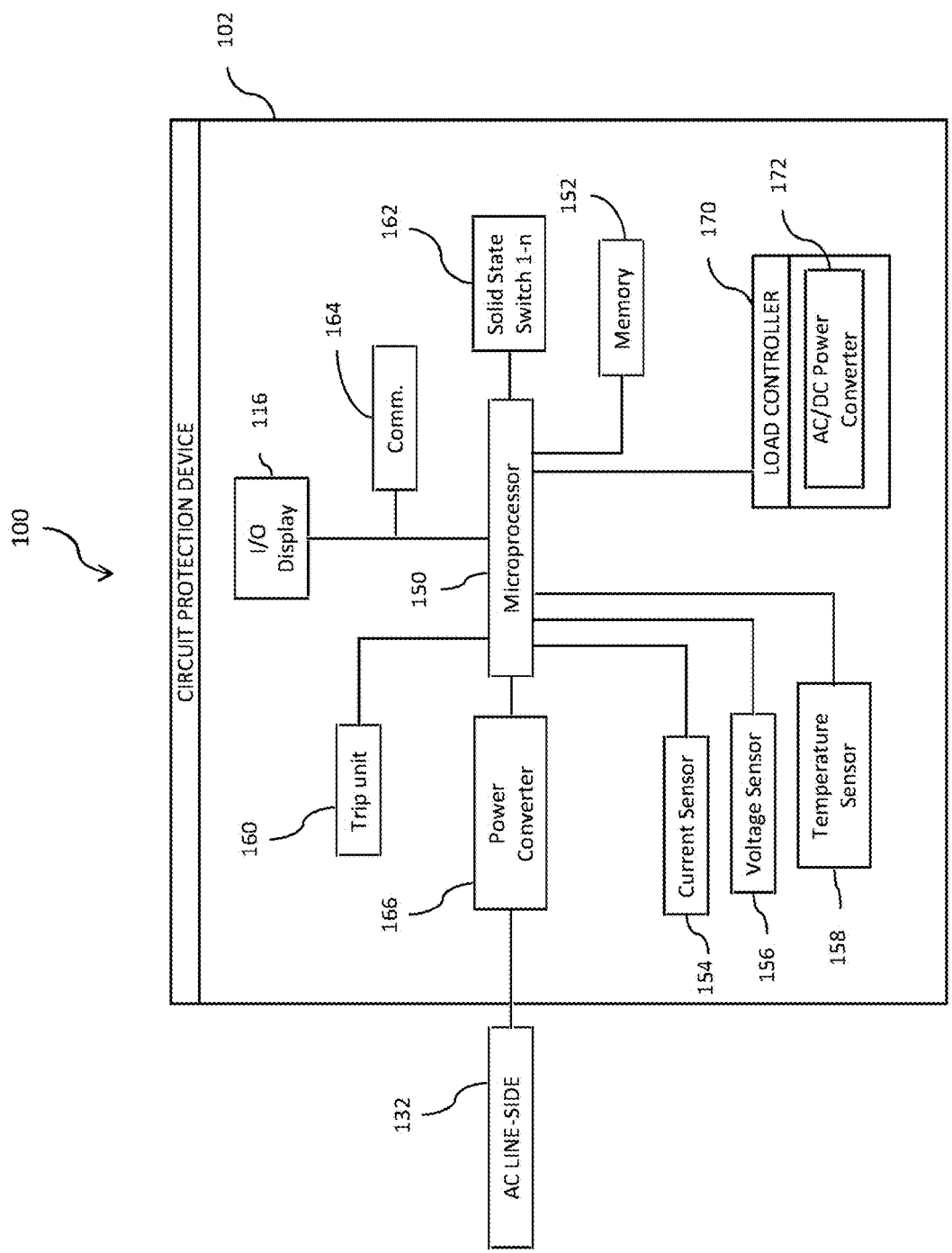
FIG. 3 is a block diagram of the circuit protection device shown in FIGS. 1 and 2.

FIG. 3 is a block diagram of the circuit protection device 100. The device 100 includes a processor-based microcontroller including a processor 150 and a memory storage 152 wherein executable instructions, commands, and control algorithms, as well as other data and information required to satisfactorily operate the device 100 are stored. The memory 152 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set circuits (RISC), application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based".

The device 100 also includes sensors 154, 156, 158 provided in a number 1 through n that equal the number of switching poles in the device 100. As such, for the three pole device 100 shown in FIGS. 1 and 2, three sensors of each type may be included that respectively detect current, voltage and temperature at respective locations in the device to assess actual operating circuit conditions in the device. Additional temperature sensors may optionally be provided per switching pole in further embodiments for enhanced temperature monitoring at a plurality of location in each pole. The sensors 154, 156 and/or 158, in turn, provide inputs to the processor 150. Thus, the processor 150, by virtue of the sensors 154, 156 and/or 158, is provided with real-time information regarding current passing through each of the solid state devices 162 in number 1 through n that equal the number of switching poles in the device 100.

The detected current is monitored and compared to a baseline current condition, such as a time-current curve or time-current profile that is programmed and stored in the memory 152 or the trip unit 160. By comparing the detected current with the baseline current condition, decisions can be made by the processor 150 to control the solid state switching elements 162, by controlling an output voltage to the gate-emitter voltage in the IGBT's described above, to cease conducting current to protect the load-side from damaging currents. In some embodiments, the trip unit 160 allows the user to select settings for the operation of the trip unit 160 and alter the time-current response of the device 100 within predetermined limits. As one such example, a user may select a current rating of the device 100 at a value from 50A to 100A, with the trip unit 160 applying the appropriate time-current curve for the selected current rating.

The detected voltage may likewise be monitored and used to make control decisions whether to operate the solid state switching elements 162 to protect the load-side circuitry and components from adverse operating conditions. Since voltage and current are related, detected voltage can be compared to detected current to facilitate an assessment of the health of the device 100, identify errors, and facilitate diagnosis and troubleshooting of the electrical power system. As other failsafe measures, voltage and current can be calculated from sensed parameters and compared to the sensor feedback to detect error conditions.

The detected temperature may likewise be monitored and used to make control decisions whether to operate the solid state switching elements 162 to protect the load-side circuitry and components from adverse operating conditions. Additionally, the detected temperature may ensure that conductors in the device 100 are operating below rated temperatures for the particular hazardous location in which it resides. For example, if the rated temperature is 200° F., the processor 150 can operate the solid state switches to disconnect and cease current flow when the operating temperature as indicated by the temperature sensors has risen to near 200° F. that could ignite airborne gases, vapors or substances in NEC Division 1 or 2 locations or IEC Zone 1 or 2 locations.

The processor 150 is in communication with the input/output display 116 to provide feedback to a user and to accept inputs made via the display 116.

The processor 150 is also in communication with the load controller 170 having the power converting circuitry 172 as shown in FIG. 2. The power converting circuitry 172 includes one or more electrical components familiar to those in the art that enable the power converting circuitry 172 to convert an AC power supply from a line-side input terminal to a DC power output at a load-side output terminal. The line-side input terminal is connected to the AC line-side circuitry 132 and the load-side output terminal is connected to DC load-side circuitry 136.

The load controller 170 converts the power from the AC line-side circuitry 132 to appropriate DC power output levels in order to power the DC load-side circuitry 136. The DC load-side circuitry 136 may include LED luminaries or other lighting devices, motors, fans, and other electrical equipment requiring a DC power supply within an industrial facility where ignitable gas vapors or substances may be airborne. The processor 150 may selectively control the DC power output levels according to values selected by the user within a certain range input to the device 100 via the I/O display screen 116, via another user interface including a remote interface, and/or pre-programmed into the device. In some example embodiments, the processor 150 may selectively control the DC power output levels based on one or more signals received from sensors 154, 156 and/or 158. In some other example embodiments, the processor 150 is configured to adjust the output DC power levels to limit energy output from the device that could otherwise present ignition concerns in the hazardous location.

In the example shown, the processor 150 receives line-side power through power converter circuitry 166. The power converter circuitry 166 includes step down components and analog to digital conversion components when necessary to supply direct current (DC) power to the processor 150 at reduced voltage in a known manner. Conversion of the line power to appropriate levels to power the electronics avoids any need for an independent power supply, such as batteries and the like or a separately provided power line for the electronic circuitry and controls that would otherwise be necessary, although in some embodiments such an independent power supply may indeed be included if needed or as desired. The controls described may be implemented on a circuit board or circuit boards in various arrangements of electronic packages, with algorithmic control features programmed and stored in the device memory.

A communication element 164 is also included that may communicate data to a remote location, as well as other device 100 as described further below to assess operation of the larger electrical power system in local and remote locations relative to any particular device 100. Wireless and non-wireless communication of data of interest, including but not limited to current data, voltage data (including waveform data), temperature data, on-off status data of the solid state switching elements, selected setting data, trip time data, etc. is possible, and such data may be stored and archived locally and remotely for analysis of the electrical power system over time. Remote actuation of the device 100 is also possible via the communication element 164.

While an exemplary architecture of the device 100 has been described, it is understood that certain elements shown in FIG. 3 may be considered optional to provide more basic functionality. Moreover, additional elements could be added to realize still further sophistication and intelligence in the operation of the device 100, as well as to provide additional functionality beyond circuit protection and disconnection functionality.

Figure 4:
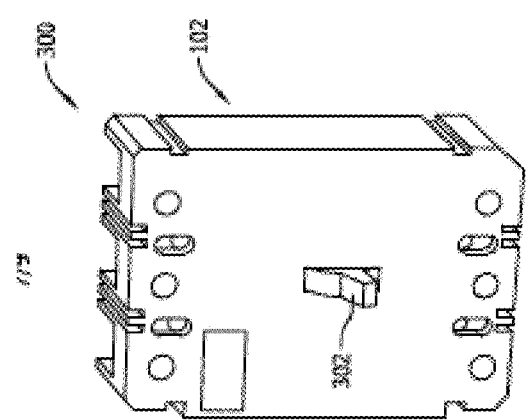
FIG. 4 is a perspective view of a compliant, hazardous location arc-less circuit protection device according to a second exemplary embodiment of the invention.

FIG. 4 is a perspective view of a compliant, explosive location circuit protection device 300 according to another exemplary embodiment of the invention. The circuit protection device 300 includes the housing 102 described having the chemical resistance, impact resistance and thermal management features described above in relation to the device 100, but omits the digital display 116 of the device 100 (FIG. 1). As shown in FIG. 4, a mechanical toggle switch 302 is accessible to a user on the upper front face of the housing 102 for manual activation of the device 300 between "on" and "off" states to connect and disconnect the load-side of the device 300 from the line-side. Manual actuators other than toggle switches may be employed in other embodiments. In some cases, the display 116 could be provided in addition to or in lieu of the toggle switch 302 or another manual actuator.

Like the device 100, the device 300 may interconnect on the line-side to a three phase power supply, i.e., an alternating current (AC) power supply, and a direct current (DC) load device on the load-side). The device 300 as shown is configured as a circuit breaker and therefore provides automatic circuit protection in response to predetermined overcurrent conditions, which may be selected by the user within a certain range and input to the device a local or remote user interface, or otherwise pre-programmed into the device. The device 300 may operate according to specified time-current curves or time-current profiles suitable to provide adequate protection for connected loads.

Figure 5:
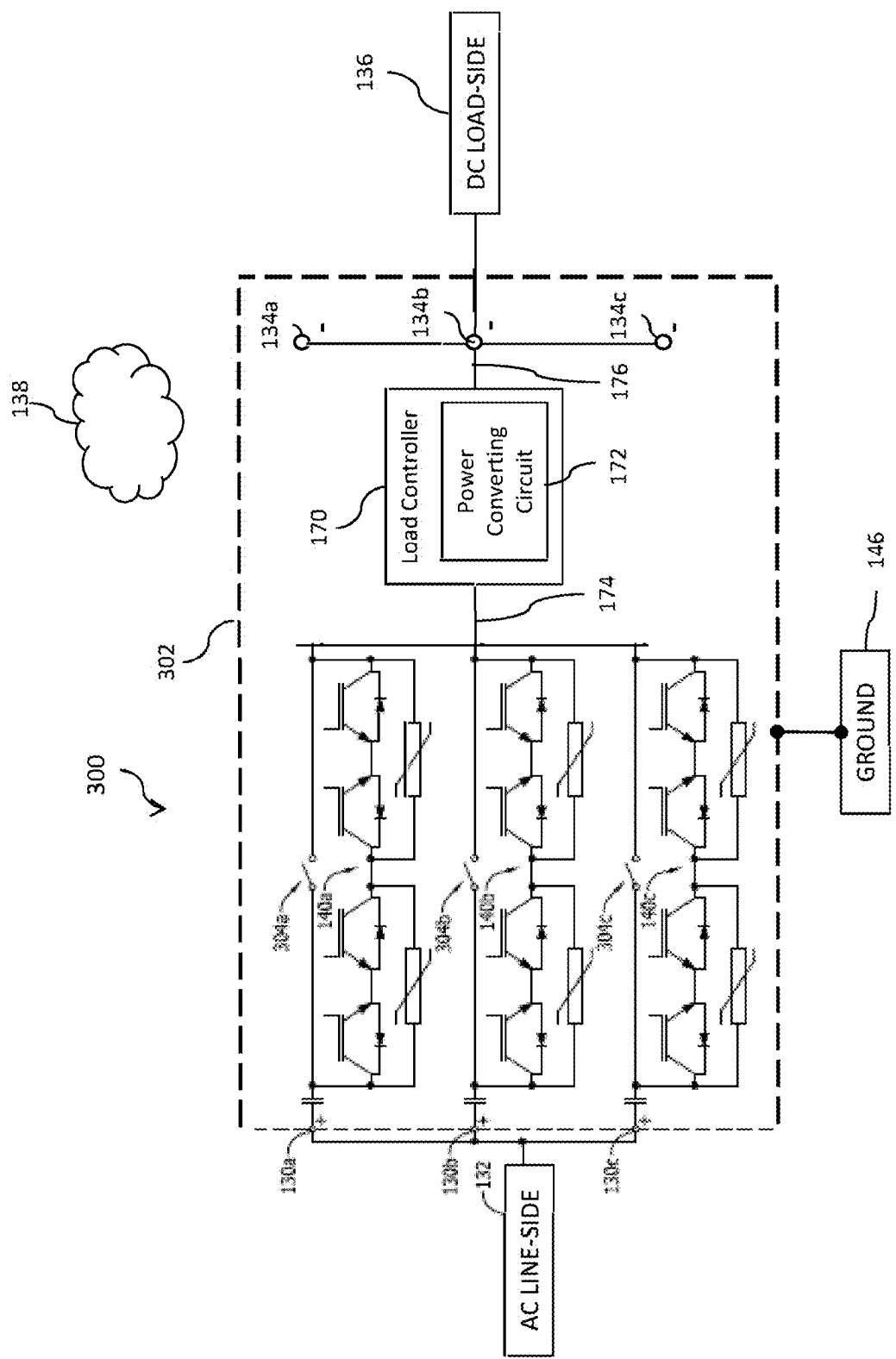
FIG. 5 is a simplified schematic diagram of the circuit protection device shown in FIG. 4 in an exemplary hybrid configuration.

FIG. 5 is a simplified schematic diagram of the circuit protection device 130 in an exemplary hybrid configuration. The device 300 includes input terminals 130a, 130b, 130c each connected to one phase of a three phase power supply, i.e., an AC power supply, indicated as AC line-side circuitry 132 in FIG. 4 via connecting cables, conduits, or wires. The device 100 further includes output terminals 134a, 134b, 136c each connected to a DC load-side circuitry 136. DC load side-circuitry 136 may include one or more of a LED luminaire or other lighting devices, motors, fans, and other electrical equipment that requires a DC power supply. The DC load-side circuitry 136, as well as the circuit protector 100, may be located in hazardous locations, for example in an industrial facility, where ignitable gas vapors or substances may be airborne as indicated at 138. The output terminals 134a, 134b, 136c may be connected to the DC load-side circuitry 136 via connecting cables, conduits, or wires. Optionally, the device 100 may further include additional elements such as auxiliary contacts and auxiliary connections, shunt trip features, undervoltage release features, communication ports and communication elements, power ports for communication and other purposes, etc.

In between each pair of input terminals 130*a*, 130*b*, and 130*c*, and output terminals 134*a*, 134*b*, and 136*c* are mechanical circuit breakers 304*a*, 304*b*, and 304*c* and parallel connected solid-state switch devices arranged as indicated at 140*a*, 140*b* and 140*c*. The exemplary solid-state switch arrangement 140*a*, 140*b*, and 140*c* includes series-connected pairs of insulated-gate bipolar transistors (IGBTs) with each pair including a varistor element connected in parallel to the IGBTs as described above. While exemplary solid-state switching arrangements are shown and described, others are possible to achieve solid-state switching functionality in an arc-less manner. As discussed above, the solid-state switching devices operate in an arc-less manner and therefore do not themselves present a risk of ignition insofar as arcing is concerned in a hazardous location.

The combination of the mechanical circuit breakers 304*a*, 304*b*, and 304*c* and the solid-state switching arrangements 140*a*, 140*b* and 140*c* can improve response times of the device 300 relative to that of the device 100. The mechanical circuit breakers 304*a*, 304, and 304*c* however, operate with mechanical switch contacts and accordingly deserve some attention to a hazardous location application as arcing can be an ignition source. The solid-state switching arrangements 140*a*, 140*b* and 140*c* that are connected in parallel to the mechanical circuit breakers 304*a*, 304*b*, and 304*c* can limit the current in mechanical circuit breakers 304*a*, 304, and 304*c* in an overload or short circuit event to reduce intensity of any arc produced to a level below that required to present an ignition concern, or otherwise preclude arcing altogether.

In addition, in between each pair of line-side input terminals 130*a*, 130*b*, 130*c* and load-side output terminals 134*a*, 134*b*, 134*c*, is a load controller 170 having power converting circuitry 172. The load controller 170 includes a load controller input 174 and a load controller output 176. The load controller output 176 generates a controlled DC power supply for power a DC electrical load device. In the embodiment illustrated in FIG. 4, the load controller output 176 is coupled to one or more of the output terminals 134*a*, 134*b*, and 134*c*. Accordingly, one or more of output terminals 134*a*, 134*b*, and 134*c* supplies a DC power output to DC load-line circuitry 136.

The load controller input 174 of load controller 170 is connected to an AC power supply. As such, the power converting circuitry 172 operates to convert the AC power supply at the load controller input 174 to the DC power output at the load controller output 176. In the embodiment illustrated in FIG. 4, the load controller input receives the AC power supply from at least one of solid state switch 140*a*, 140*b*, and/or 140*c*. In some embodiments, the load controller input 174 may instead receive the AC power supply directly from the AC line-side circuitry 132. Additionally, while one load controller 170 is shown in FIG. 4, multiple load controllers 170 may alternative be provided to supply output power to the same or different DC load devices connected to the load-side terminal (or terminals) of the device 100.

The load controller 170 may vary the DC power level of the load controller output 176 according to one of plurality of user-selected settings which may be selected by the user within a certain range input to the device 100 via the display screen 116, via another user interface including a remote interface, and/or pre-programmed into the device.

The device 300 may likewise be connected to electrical ground 146 to dissipate any charging of the housing surface as described above, thereby precluding a possible ignition source via static discharge as described above. In contemplated embodiments, the housing 102 of the device 300 may be fabricated from metallic or non-metallic materials. In some cases involving certain metallic or non-metallic materials, strategic selection of housing materials, filler materials and encapsulant materials is necessary in order to address static electricity concerns. Combinations of conductive and non-conductive materials, both internal to the device 300 and external to the device 300 may be utilized to provide paths to electrical ground as appropriate.

The device 300 is likewise connected to an electrical ground 146 to dissipate any charging of the housing surface as described above, thereby precluding a possible ignition source via static discharge. The line and load-side connections may be established using secure terminal assemblies including but not limited to locking terminal features to prevent loosened connections over time after initially being secured with a fastener, and connections made to enclosed terminals via armored cable and cable glands to provide enhanced safety assurance for explosive environments.

Figure 6:
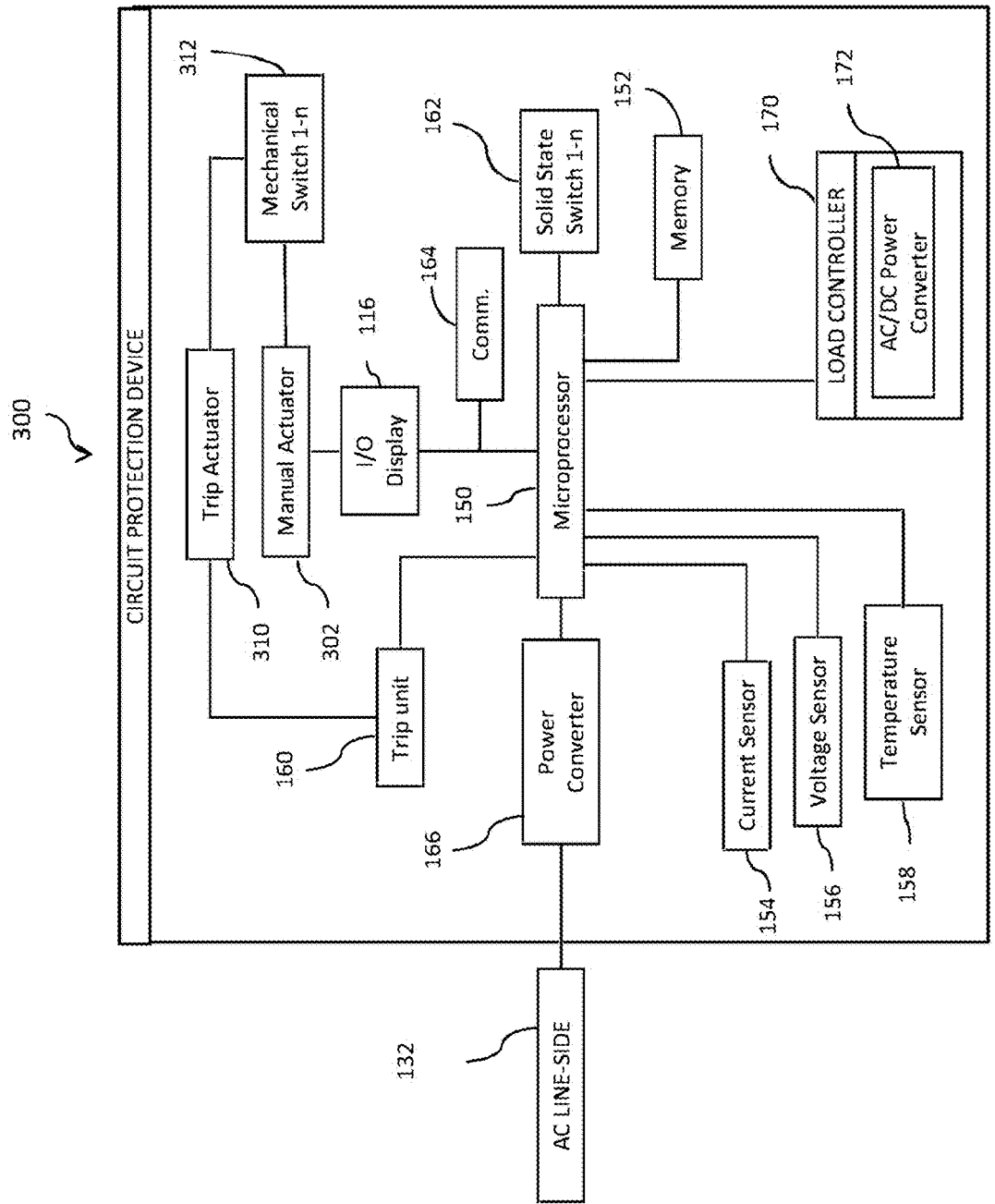
FIG. 6 is a block diagram of the circuit protection device shown in FIGS. 4 and 5.

FIG. 6 is a block diagram of the circuit protection device 300 including, in addition to the elements described above in the device 100, control inputs for the manual actuator 302, and a trip actuator 310 for operating the mechanical circuit breakers 312 including the mechanical switches.

When predetermined overcurrent conditions arise, the trip unit 160 causes the trip actuator 310 to displace the movable switch contacts and open the circuit through the device 300. The trip actuator may be an electromagnetic member such as a solenoid that can simultaneously displace the switch contacts of each mechanical breaker provided in the device 300, with the solid-state switching arrangements 140*a*, 140*b* and 140*c* limiting the current as the displacement of the switch contacts occurs. The manual actuator 302 can thereafter be used to reset the device 300 by closing the mechanical switches.

While an exemplary device architecture has been described for the device 300, it is understood that certain of the elements shown in FIG. 6 may be considered optional to provide more basic functionality, as well as additional elements could be added to realize still further sophistication and intelligence in the operation of the device 300.

Figure 7:
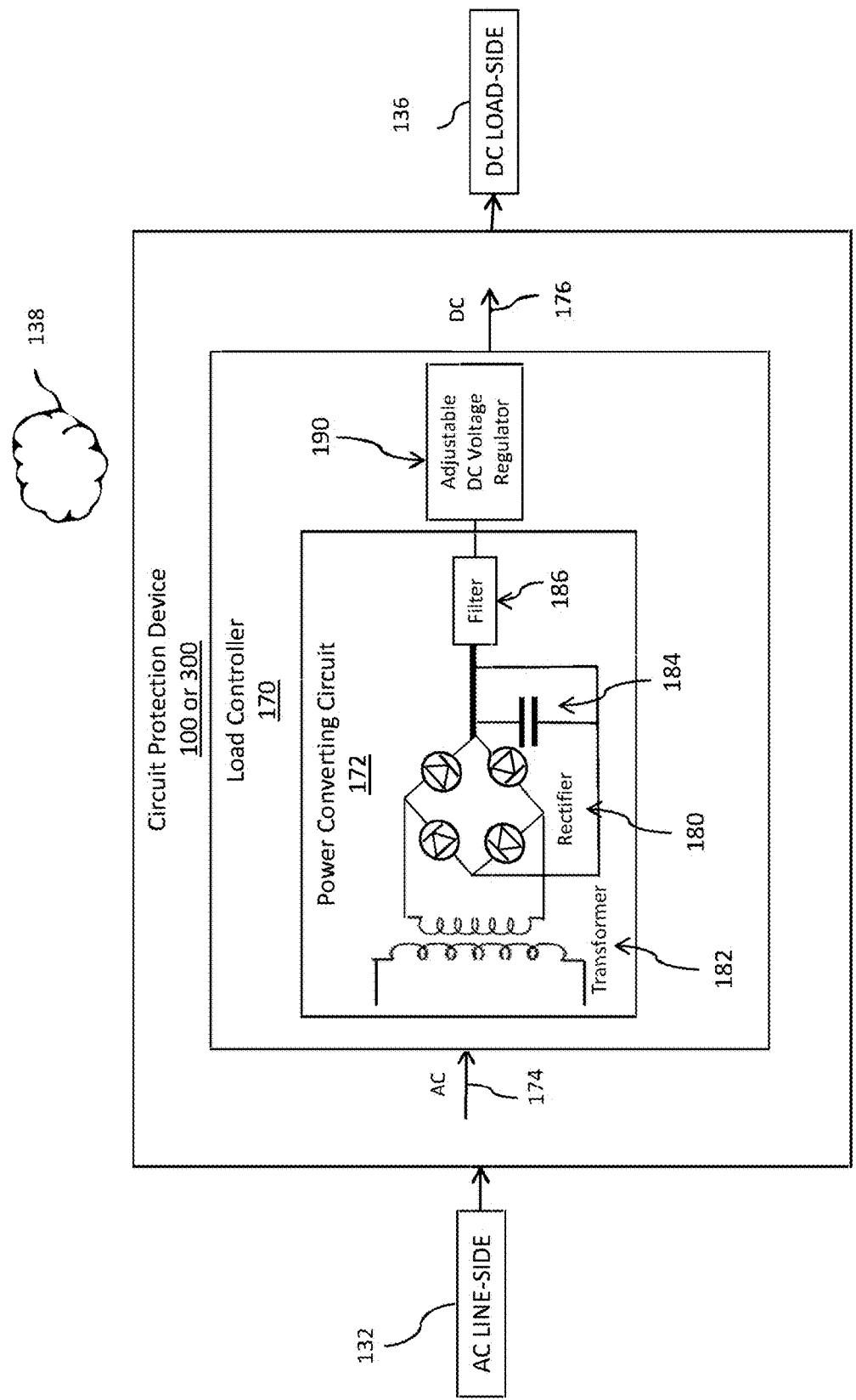
FIG. 7 is a block diagram of the load controller and power converting circuitry for use with circuit protection devices shown in FIGS. 1 and 8.

FIG. 7 is a simplified schematic diagram of an example embodiment of the load controller 170 including the power converting circuitry 172 for use with the device 100 and/or device 300. The a power converter circuitry 172 operates to convert an AC power supply input from a line-side input terminal to a DC power output at a load-side output terminal. In this illustrated embodiment, the AC line-side circuitry 132 is coupled to the line-side input terminal and the DC load-side circuitry 136 is coupled to the load-side output terminal. The load controller 170 varies the level of the DC power output according to one of a plurality of user-selected settings, to power specific types of DC load devices at optimal levels.

The load controller 170 includes a load controller input 174 for receiving the AC power supply and a load controller output 176 supplying the controlled DC power output. In some example embodiments, the load controller input 174 may be coupled directly to the AC line-side terminal 132 and accordingly the one or more solid state switch devices 140*a*, 140*b*, and 140*c* are coupled to the load controller output 176, such that the load controller 170 supplies the controlled DC power output to the one or more solid state switch devices 140*a*, 140*b* and 140*c*. In other example embodiments, the one or more solid state switch devices 140*a*, 140*b* and 140*c* are directly coupled to the AC line-side terminal 132, accordingly, the load controller input 174 receives an AC power supply from the one or more solid state switches 140a, 140b and 140c.

The load controller 170 and the power converter circuitry 172 may include one or more electrical components that enable the power converting circuitry 172 to convert the AC power supply to a controlled DC power output. For example, the power converting circuitry 170 includes one or more rectifiers 180. Further, the rectifier 180 may include at least one of uncontrolled, half-controlled, and/or full controlled rectifier. The rectifier 180 includes one or more diodes that direct the flow of the current in a single or isolated direction in a known manner.

The power converting circuit 172 may also include one or more transformers 182. Each transformer 182 may include a step-down or step-up transformer that is used to adjust the voltage or current of the AC power supply to an appropriate level, prior to rectifier 180. For example, transformer 182 may be used to lower the AC power supply of 120 volts or 240 volts to any desired voltage input to the rectifier 180.

The power converting circuit 172 may also include a capacitor 184 connected across the DC power output of the rectifier 180. The capacitor 184 may include an electrolytic capacitor operating to smooth the output current or voltage. Further, power converting circuit 172 may also include one or more of filters 186 to prevent electrical noise in the power output by attenuating higher frequency noise and harmonics that may be present. The filter 186 may also include one or more varistors preventing voltage spikes from the electrical power grid. The load controller 170 further includes a DC regulator 190 used to regulate the DC power output of the rectifier 180 in a known manner. In some example embodiments, the load controller 170 is configured to adjust an output pulsed DC power to the DC load device, which may be an LED luminaire or an LED lighting device. In other contemplated embodiments, pulse power control elements can be embedded or integrated in the LED luminaire which are operable by the DC power output of the device 100 or 300, in lieu of or in addition to pulse power control elements provided in the device 100 or 300.

While specific examples of components in the converter circuitry have been described and illustrated, in other exemplary embodiments, the controller 170 and power converting circuit 172 may include additional or alternative electronic components as known in the art, which enable the load controller 170 to convert an AC power supply at the line-side input terminal to a desired DC power output at the load-side output terminal.

Figure 8:
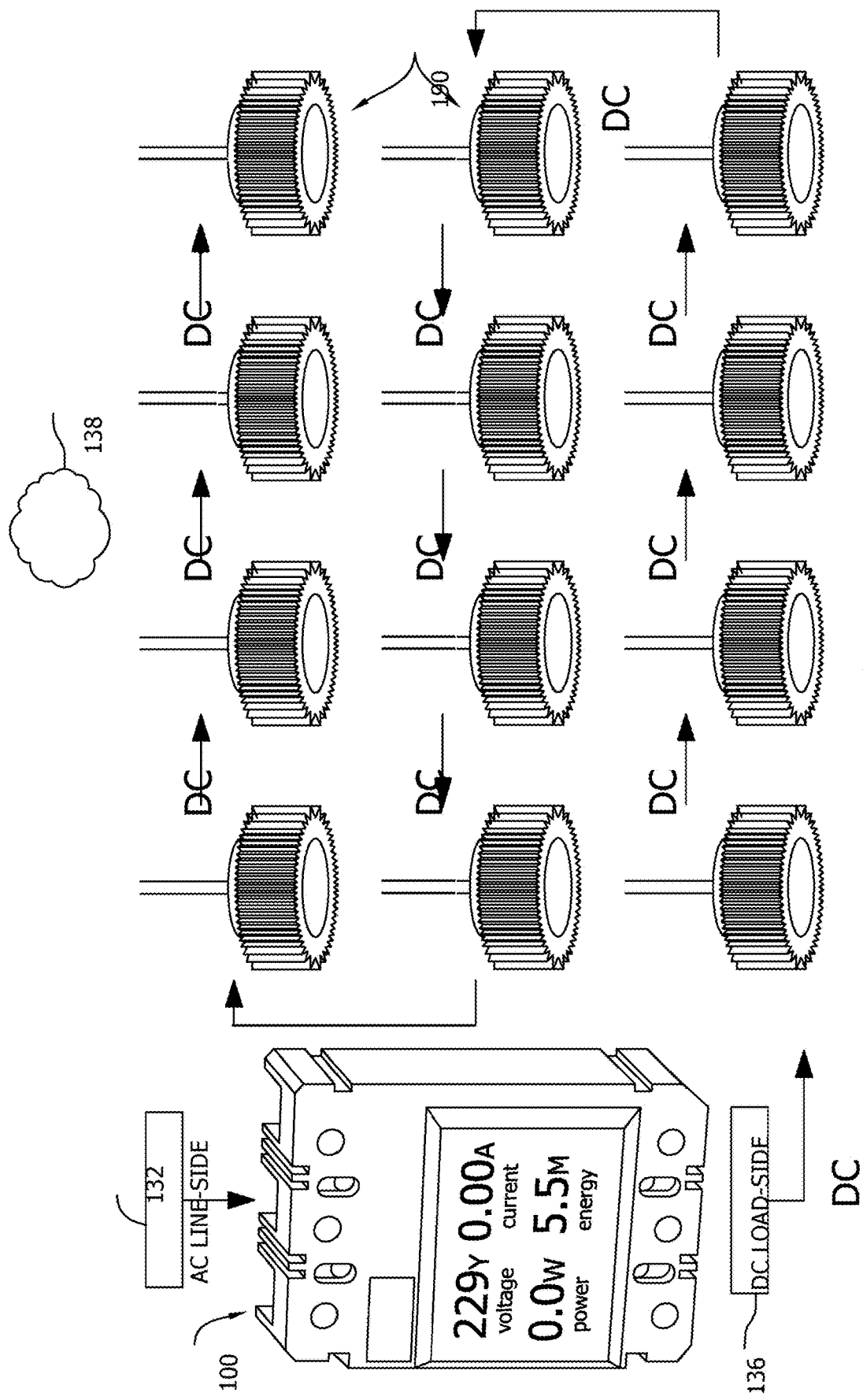
FIG. 8 is simplified schematic of an exemplary electrical power conversion and control system including the circuit protection device shown in FIGS. 1-7 supplying a controlled DC power to a plurality of DC load devices within a hazardous location.

FIG. 8 illustrates an exemplary electrical power conversion and control system including the circuit protection device 100 according to an exemplary embodiment. In the illustrated hazardous application of the system, the circuit protection device 100 or 300 is connected the DC load-side circuitry 136 which includes a plurality of DC load devices 190 within an industrial facility wherein ignitable gas, vapors or substances may be airborne as indicated at 138. The circuit protection device 100 is coupled to the AC line-side circuitry 132 including an AC power supply and the load-side output terminal supplies a controlled DC power output to the plurality of DC load devices 190. The load controller 170 varies the level of the DC power output to the plurality of DC load devices 190 according to one of a plurality of user-selected settings and/or pre-programmed parameters or specified time schedules. In some contemplated embodiments, the load controller 170 is configured to adjust an output pulsed DC power to the DC load device 190, although in other embodiments pulsed output power may be considered optional for certain types of electrical load devices and need not be provided.

The plurality of DC load devices 190 need not include integrated AC/DC converting circuitry because the circuit protector device 100 supplies the desired DC output to each load device 190. In some cases, however, the plurality of DC load devices 190 may include a DC/DC converter to regulate the supplied DC output power as it reaches each individual DC load device 190. For example, a DC/DC converter provided in the load device 190 may step up or step down a voltage when needed, but need not convert AC power to DC power as conventional load devices often do. In particular, over long runs of series-connected devices, an expected voltage drop will be experienced for some of the load devices 190 which can be compensated by each device 190. Additionally, the output DC power of the circuit protection device 100 may be set higher than needed to compensate for voltage drop on a long run of series-connected load device 190, and when needed the load devices 190 may step down the power received to a more optimal level. In such examples, DC/DC power converters may still be integrated in the design of the load devices 190, while still avoiding costs of providing AC/DC power converters in the load devices 190.

In the example illustrated in FIG. 8, the plurality of DC load devices 190 includes a series of light emitting diodes (LED) luminaires which are compliant for hazardous locations within an industrial facility. Alternative installations of LED luminaires in other locations that may not necessarily be harsh or hazardous are, however, possible.

By virtue of the circuit protector 100 described above including AC/DC power conversion features for the load-side outputs, the LED luminaires do not themselves need to include an AC/DC power converter, and such integrated AC/DC power converters are therefore not included in the LED luminaires. In some example embodiments, each of the plurality of LED luminaires may include a DC/DC power converter integrated with LED luminaire for the reasons above concerning longer runs of devices connected to the circuit protector 100. The load controller 170 in the device 100 varies the level of the DC power output to the plurality of LED luminaires according to one of a plurality of user-selected settings and/or pre-programmed parameters and/or specified time schedules. For example, the load controller 170 may in some cases be pre-programmed to lower the supplied DC power level to the LED luminaires, in order to dim and/or shut off the LED luminaires when workers are not expected in designated areas of the facility to lower energy consumption.

In some other example applications, the DC power output may be connected to additional and/or alternative DC load devices 190 that are compliant for hazardous locations, in lieu of or in combination with LED luminaires. In contemplated embodiments, and as illustrated in FIG. 8 a plurality of DC loads devices 190 are connected in-line and in series to one another and are powered by one of the load-side output terminals of the circuit protection device 100 or 300. By virtue of the power conversion made via the circuit protector 100 or 300, the DC load devices 190 do not require circuitry to convert an AC power supply to a DC power output and as such lower cost DC load devices 190 may be utilized that do not include AC/DC power conversion features. In some cases, the DC load devices 190 may still include a DC/DC power converter to adjust or regulate the supplied DC power output when it reaches the DC load device 190 over a long run of devices as described above. Either way, over a large number of load devices 190, considerable cost savings will result via elimination of individual AC/DC power converters in each device 190.

Importantly, considering that power converters in load devices 190 such as LED luminaires are prone to reliability issues in use, improved reliability of the load devices 190 is realized and maintenance costs of the lighting system are reduced since impairments of failure modes of the LED luminaires attributable to integrated power converters is eliminated. Time and labor costs are therefore saved that would otherwise be required to identify and replace impaired or defective LED luminaires or otherwise troubleshooting the system to diagnose issues with respect to individual luminaires or runs of luminaires.

The benefits and advantages of the inventive concepts are now believed to have been amply illustrated in relation to the exemplary embodiments disclosed. An embodiment of an electrical power conversion and control system for a hazardous location has been disclosed.

An embodiment of an electrical power conversion and control system has been disclosed that includes a circuit protection device. The circuit protection device includes a housing, a line-side terminal and a load-side terminal coupled to the housing and including at least one solid state switching element operable in an arc-free manner to limit or preclude electrical current flow from the line-side terminal to the load-side terminal. The circuit protection device further includes a load controller in the housing which includes power converter circuitry operative to convert an alternating current (AC) power supply input to the line-side terminal to a direct current (DC) power output at the load side terminal.

Optionally, the circuit protection device may further include at least one DC load device. The at least one DC load device may not include an AC/DC power converter. The at least one DC load device may include a DC/DC power converter. In some examples, the at least one DC load device may be a light emitting diode (LED) luminaire. The LED luminaire may be compliant for use in a hazardous location. The at least one DC load may include a plurality of DC loads connected in series to one another and to the load-side terminal of the circuit protection device. The plurality of DC loads may be each light emitting diode (LED) luminaires. At least some of the light emitting diode (LED) luminaires may include a DC/DC power converter.

Optionally, the load controller may be configured to vary the voltage of the DC power output according to one of a plurality of user-selected settings. The load controller may also be configured to adjust an output pulsed DC power to the DC load device.

Also optionally, the housing of the circuit protection device is ignition-protected for compliant use in a hazardous location. The housing of the circuit protection device may be electrically grounded. The housing of the circuit protection device may exhibit anti-static properties. The housing of the circuit protection device may be chemically resistant in a hazardous location.

Also optionally, the circuit protection device may further include at least one temperature sensor. The at least one solid state switching element is operable in response to input from the at least one temperature sensor to limit or preclude electrical current flow from the line-side terminal to the load-side terminal and maintain an operating temperature of the circuit protection device below a rated temperature limit, thereby rendering the circuit protection device compliant for use in the hazardous location without requiring a separately provided explosion-proof enclosure.

As further options, at least one mechanical switch contact connected may be between the line-side terminal and the load-side terminal in the switch device, and the housing of the switch device may include a sealed internal enclosure containing the at least one mechanical switch contact, thereby precluding the switch contact from being an ignition source in a hazardous location. The at least one solid state switching element may be encapsulated. The circuit protection device may be configured as a solid state circuit breaker device. The circuit protection device may be configured as a hybrid circuit breaker device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical power conversion and control system comprising:
    a circuit protection device comprising:
        a housing;
        a line-side terminal and a load-side terminal;
        at least one solid state switching element operable in an arc-free manner to limit or preclude electrical current flow from the line-side terminal to the load-side terminal; and
        a load controller in the housing and including a power converter circuitry operative to convert an alternating current (AC) power supply input to the line-side terminal to a direct current (DC) power output at the load side terminal, wherein the load controller is configured to adjust an output pulsed DC power to a DC load device.

2. The electrical power conversion and control system of claim 1, wherein the load controller is configured to vary the voltage of the DC power output according to one of a plurality of user-selected settings.

3. The electrical power conversion and control system of claim 2, wherein the housing of the circuit protection device is ignition-protected for compliant use in a hazardous location.

4. The electrical power conversion and control system of claim 3, wherein the circuit protection device further includes at least one temperature sensor, and wherein the least one solid state switching element is operable in response to input from the at least one temperature sensor to limit or preclude electrical current flow from the line-side terminal to the load-side terminal and maintain an operating temperature of the circuit protection device below a rated temperature limit, thereby rendering the circuit protection device compliant for use in the hazardous location without requiring a separately provided explosion-proof enclosure.

5. The electrical power conversion and control system of claim 1, wherein the DC load device does not include an AC/DC power converter.

6. The electrical power conversion and control system of claim 1, wherein the DC load device includes a DC/DC power converter.

7. The electrical power conversion and control system of claim 1, wherein the DC load device is a light emitting diode (LED) luminaire.

8. The electrical power conversion and control system of claim 7, wherein the light emitting diode (LED) luminaire is compliant for use in a hazardous location.

9. The electrical power conversion and control system of claim 1, wherein the DC load device comprises a plurality of DC loads connected in series to one another and to the load-side terminal of the circuit protection device.

10. The electrical power conversion and control system of claim 9, wherein the plurality of DC loads are each light emitting diode (LED) luminaires.

11. The electrical power conversion and control system of claim 10, wherein at least some of the light emitting diode (LED) luminaires include a DC/DC power converter.

12. The electrical power conversion and control system of claim 1, wherein the at least one solid state switching element is encapsulated.

13. The electrical power conversion and control system of claim 1, wherein the circuit protection device is configured as a solid state circuit breaker device.

14. The electrical power conversion and control system of claim 1, wherein the circuit protection device is configured as a hybrid circuit breaker device.

15. The electrical power conversion and control system of claim 1, wherein the housing of the circuit protection device is electrically grounded.

16. The electrical power conversion and control system of claim 1, wherein the housing of the circuit protection device exhibits anti-static properties.

17. The electrical power conversion and control system of claim 1, wherein the housing of the circuit protection device is chemically resistant in a hazardous location.

18. An electrical power conversion and control system comprising:
    a circuit protection device comprising:
        a housing;
        a line-side terminal and a load-side terminal;
        at least one solid state switching element operable in an arc-free manner to limit or preclude electrical current flow from the line-side terminal to the load-side terminal; and
        a load controller in the housing and including a power converter circuitry operative to convert an alternating current (AC) power supply input to the line-side terminal to a direct current (DC) power output at the load side terminal, wherein the electrical power conversion and control system further comprises at least one DC load device, and wherein the at least one DC load device includes a DC/DC power converter.

19. An electrical power conversion and control system comprising:
    a circuit protection device comprising:
        a housing;
        a line-side terminal and a load-side terminal;
        at least one solid state switching element operable in an arc-free manner to limit or preclude electrical current flow from the line-side terminal to the load-side terminal; and
        a load controller in the housing and including a power converter circuitry operative to convert an alternating current (AC) power supply input to the line-side terminal to a direct current (DC) power output at the load side terminal, wherein the electrical power conversion and control system further comprises at least one DC load device, wherein the at least one DC load device comprises a plurality of DC loads connected in series to one another and to the load-side terminal of the circuit protection device, and wherein the plurality of DC loads comprises a plurality of light emitting diode (LED) luminaires.

20. An electrical power conversion and control system comprising:
    a circuit protection device comprising:
        a housing;
        a line-side terminal and a load-side terminal;
        at least one solid state switching element operable in an arc-free manner to limit or preclude electrical current flow from the line-side terminal to the load-side terminal; and
        a load controller in the housing and including a power converter circuitry operative to convert an alternating current (AC) power supply input to the line-side terminal to a direct current (DC) power output at the load side terminal, wherein the electrical power conversion and control system further comprises at least one mechanical switch contact connected between the line-side terminal and the load-side terminal in a switch device, and wherein the housing of the switch device includes a sealed internal enclosure containing the at least one mechanical switch contact, thereby precluding the switch contact from being an ignition source in a hazardous location.

* * * * *